(12) United States Patent
Fu (10) Patent No.: US 7,237,980 B2
(45) Date of Patent: Jul. 3, 2007

(54) SYSTEM FOR INFILTRATING AND IRRIGATING WATER INTO SOIL

(76) Inventor: Changbiao Fu, 9024, No. 9 Xi cui Lu Road, Haidian District, Beijing 100036 (CN)

( * ) Notice: Subject to any disclaimer, the term of this patent is extended or adjusted under 35 U.S.C. 154(b) by 0 days.

(21) Appl. No.: 10/471,392

(22) PCT Filed: Dec. 17, 2002

(86) PCT No.: PCT/CN02/00894

§ 371 (c)(1),
(2), (4) Date: Sep. 8, 2003

(87) PCT Pub. No.: WO03/051102

PCT Pub. Date: Jun. 26, 2003

(65) Prior Publication Data

US 2004/0115000 A1 Jun. 17, 2004

(30) Foreign Application Priority Data

Dec. 17, 2001 (CN) .............................. 01 2 78709

(51) Int. Cl.
*A01G 25/00* (2006.01)
*A01G 29/00* (2006.01)
(52) U.S. Cl. ..................... 405/36; 405/41; 137/236.1
(58) Field of Classification Search ................. 405/36, 405/39–41, 43, 45; 239/200, 201; 137/236.1
See application file for complete search history.

(56) References Cited

U.S. PATENT DOCUMENTS 3,849,991 A * 11/1974 Niederwemmer ............ 405/38
3,939,875 A * 2/1976 Osborn et al. .............. 138/178
3,946,762 A * 3/1976 Green ........................ 405/45
4,162,863 A * 7/1979 Gaudard et al. ............. 405/45
4,221,501 A * 9/1980 Saburi ........................ 405/37
4,235,561 A * 11/1980 Peterson .................... 405/45
4,832,526 A * 5/1989 Funkhouser, Jr. ........... 405/43

(Continued)

FOREIGN PATENT DOCUMENTS

CN 2388813 Y 7/2000

(Continued)

OTHER PUBLICATIONS

Meshkat et al., ABSTRACT: "Comparison of Water and Temperature Distribution Profiles Under Sane Tube Irrigation", 1998, www.asae.frymulti.com/abstract/asp?aid=17341&t=2.*

*Primary Examiner*—Tara L Mayo
(74) *Attorney, Agent, or Firm*—Yi Li (57) ABSTRACT

A soil infiltration irrigation system includes a plurality of water-permeable containers and a water-feeding pipeline communicating with each of the containers. The containers are provided with connectors for connecting to the water-feeding pipeline and are also provided with an air-relieving pipe connected to the container. The water-feeding pipeline supplies water from a water supply reservoir which can feed the water-feeding pipeline either by gravity or by a booster pump in the pipeline. The air-relieving pipe has an air outlet installed at an elevation that maintains a water level in each container. The containers may be double-layered, with the air pipe communicating with an inner layer and the outer layer communicating with the water-feeding pipeline.

15 Claims, 9 Drawing Sheets

U.S. PATENT DOCUMENTS

| | | | |
|---|---|---|---|
| 4,917,795 A * | 4/1990 | Sable et al. | 210/120 |
| 4,919,568 A * | 4/1990 | Hurley | 405/43 |
| 4,930,934 A * | 6/1990 | Adkins | 405/37 |
| 5,152,634 A * | 10/1992 | Maso | 405/45 |
| 5,374,138 A * | 12/1994 | Byles | 405/38 |
| 5,788,409 A * | 8/1998 | Johnson | 405/43 |
| 5,799,440 A * | 9/1998 | Ishikawa et al. | 47/65 |
| 5,803,111 A * | 9/1998 | Soszka | 137/207.5 |

FOREIGN PATENT DOCUMENTS

| | | |
|---|---|---|
| CN | 1262862 A | 8/2000 |
| CN | 2453677 Y | 10/2001 |

* cited by examiner

SYSTEM FOR INFILTRATING AND IRRIGATING WATER INTO SOIL

TECHNICAL AREA

This Invention relates to a soil infiltration irrigation system and its implementation. In particular, it relates to a direct irrigation system wherein a water-feeding and air-relieving combination system transports water into containers, from which the water infiltrates slowly into soil at appropriate locations around the plants.

BACKGROUND TECHNOLOGY

Sprinkling irrigation and micro irrigation are two common examples of employing advanced technology in water conservation and high efficiency irrigation. In China, only 2% of the total irrigation area benefits from this technology whereas the developed countries apply this technology to over 80% of their total irrigated areas. The need for China's agriculture to implement water conservation technology is quite obvious, especially in regions that have a shortage of water resources. However, sprinkling irrigation has some problems, such as blind spots that do not get irrigated, susceptibility to the influence of wind velocity and direction, loss of water by evaporation, and insufficient supply of water to the deep soil layers. In micro irrigation systems, the water outlets are so small that they easily get clogged with mineral or organic particles in the water. Water pressure in the feeding lines is often affected by the terrain, causing an uneven supply of water in the system and thus reducing the effectiveness of irrigation.

In the conventional technology, there is a system called "Underground Infiltration Irrigation Device with Water Replenishment and Storage Capabilities" (Patent Application No. 00268186.2), which consists of a water permeable storage container, a lid, a water supply pipe, a water-feeding and air-relieving pipe, and a plug. The lid is installed on the container. The water-feeding and air-relieving pipe is connected to the lid at one end and to the water supply pipe at the other end. The water-feeding and air-relieving pipe contains two parallel hoses inside: one for water feeding and the other for air relieving. When the container is filled with water, the water replenishment process is halted. Then, it is necessary to disconnect the water supply pipe from the water-feeding and air-relieving pipe and also insert a plug to stop the opening of the latter pipe. That process is very time-consuming and labor-intensive. In addition, the water supply pipe takes up some space that might be used for growing plants. What's more, the water supply pipe is not easy to use, thus adversely affecting the irrigation efficiency.

Another example of the conventional technology is a small irrigation device called "Root Infiltration Irrigation Cup" (Patent Application No. 99246573.7), which consists mainly of a cylindrical cup of a specific volume. The said cup has 1-4 groups of infiltration holes on the side walls of the bottom section. Each group has 1-4 directional holes, which are covered with a screen made of non-woven cloth, embedded steel wool and sand filtration material or stainless steel composite filtration meshes. The cup has a lid with a water feeding pipe attached and an air relieving hole in it. Once the lid is placed over the upper opening of the cylindrical cup, a water supply pipe is connected to the water feeding pipe. The cup is buried near the roots of the plant, with the lid a little over the ground. In actual application, water has to be transported to each individual cup. Liquid fertilizers may be mixed with water so that irrigation and fertilizer application are achieved at the same time. This "Root Infiltration Irrigation Cup" also has problems such as the need to feed water to each individual cup, the occupation of space that might be used for growing plants, and the difficulty with maintenance.

All in all, the applications of the conventional technology discussed above have the common problems of time-consuming and labor-intensive operation, high maintenance cost, short life time, low recovery rate of used materials, frequent assembly and disassembly requirements, possibility of damage to plants, ineffective use of water resources, high evaporation loss rate, low irrigation efficiency, occupation of plant growth space, and adverse effect on the natural growth of plants.

SCOPE OF THE INVENTION

The purpose of this Invention is to provide a soil infiltration irrigation system and its implementation, which used underground containers such as water permeable vats or double-layer vats to send water directly to plant roots, thus eliminating the problem of water evaporating on the ground. The containers are placed where the plant roots need water. This placement eliminates blind spots of irrigation and the waste of water resources.

Another purpose of this Invention is to use the water feeding pipe and the air relieving pipe to transport water directly into the containers and then let the water directly infiltrate the soil around the plant roots. This approach of one-time investment input for long-time use does not occupy any space on the ground surface and achieves the goal of efficient energy conservation and optimal usage of water resources.

The technical implementation of this Invention involves a soil infiltration irrigation system which consists primarily of a water feeding pipeline, an air relieving pipeline and multiple water permeable storage containers that are pressure resistant. Each container comprises at least two components, which are coupled properly to shut out sand and dirt. The top component has a water feeding pipe connector and an air relieving pipe connector. The said connectors are connected respectively to the water feeding pipe and the air relieving pipe by means of adapters. The two pipes are in turn connected by means of hetero-diameter adapters to branch pipes leading to the main water feeding pipeline and the main air relieving pipeline. Thus, a system of two parallel pipelines is formed, wherein:

Any point in the system may be selected as the water feeding point and be used to complete the irrigation task. One or multiple outlets may be chosen. The outlets are the elevated points on the system. Each outlet may stand alone and all the air relieving pipes need not be interconnected. An effective air relieving point must be established at the highest elevation on the infiltration irrigation system.

The equipment used in this infiltration irrigation system is a water permeable vat, which consists of a vat body and a lid. The vat body is the water storage container and has a meshed water permeable internal structure. The lid has two connectors installed, one for the water feeding pipe and the other for the air relieving pipe, wherein:

The said vat body and vat lid may be separate components or a composite unit. The circular edge of the lid forms a band that encircles the vat body on the outer surface.

The equipment used in this infiltration irrigation system is a double-layer water permeable vat, which consists of an inner layer vat body, an outer layer vat body and a lid. The inner layer vat body and the outer layer vat body form the water storage container. The outer layer vat body has water overflow holes and air relieving holes, which are connected to the inner layer vat body. The vat has a meshed water permeable internal structure. The lid has two connectors installed, one for the water feeding pipe and the other for the air relieving pipe, wherein:

The said water feeding connector is connected to the outer layer vat body while the air relieving connector is connected to the inner layer vat body. The bottom section of the outer layer vat body is solid and water resistant.

The said inner layer vat body, outer layer vat body and vat lid are separate components. The circular edge of the lid forms a band that encircles the outer layer vat body on the outer surface to form a composite unit.

The equipment used in this infiltration irrigation system may also include a two-way air relieving and water shut-off valve, which consists mainly of a valve body, a valve head, and an air relieving cap, which sits on the valve head. The cap has multiple air relieving holes on its perimeter and a semi-spherical valve core inside. The valve body has an integral bracket with a blue frame. Inside the blue frame is a hollow floating ball, which may be made of rubber or metals. The upper opening of the valve body connects with the valve head. An air relieving connector is installed in the lower opening at the bottom section of the valve body, wherein:

The valve head is a hollow dome. Its bottom opening has grooves to connect with the outer edge of the upper opening of the valve body. In the upper section of the valve head is a valve seating cage. The upper end of the seating cage with external screw threads on the perimeter is the semi-spherical valve core seat. The lower end of the seating cage is the floating ball seat. The seating cage, the semi-spherical valve core and the floating ball are on the same axial line.

The said air relieving cap is a hollow cylinder. The semi-spherical valve core sits in the center of the upper interior of the cap. There are multiple evenly spaced through-holes on the perimeter of the cap. The bottom part of the cap is a flange with an opening that has internal screw threads and evenly spaced round holes.

The said bracket also includes a floating ball holder at the bottom of the blue frame. The holder is at the same axial angle with the valve seating cage so that, after the floating ball floats up, the holder may hold the ball in the lower seat of the valve seating cage.

IMPLEMENTATION OF THE INVENTION

Figure 1:
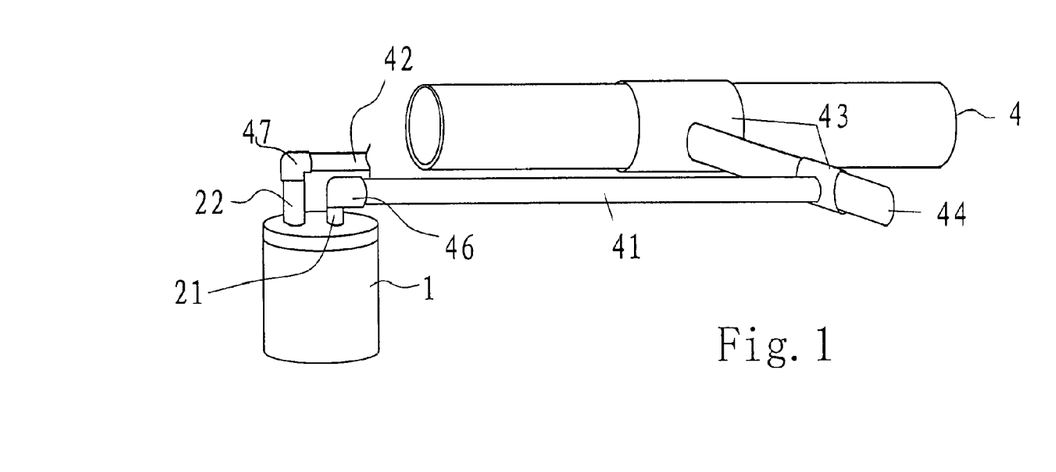
FIG. 1 shows the pipeline connection for the soil infiltration irrigation system in this Invention (part 1).
Figure 2:
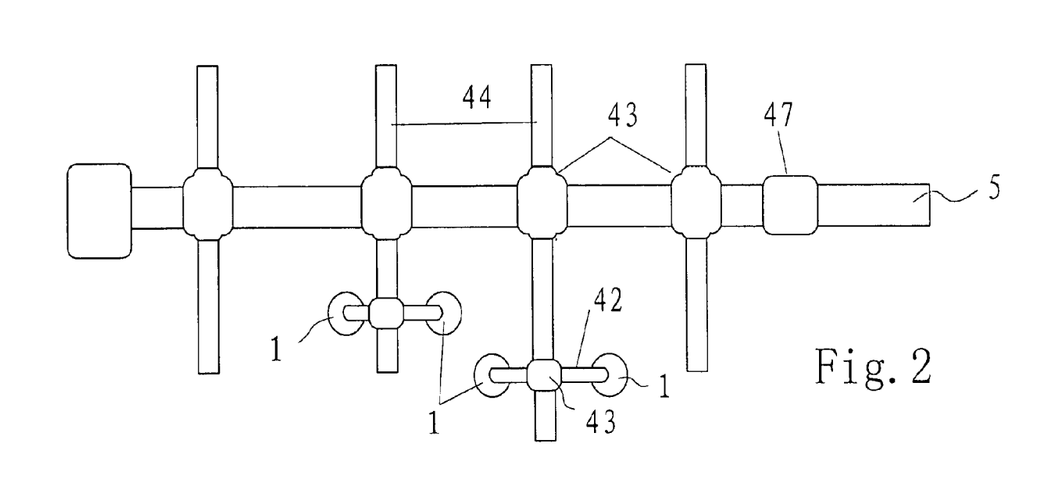
FIG. 2 shows the pipeline connection for the soil infiltration irrigation system in this Invention (part 2).

See FIGS. 1 and 2. This Invention relates to an underground infiltration irrigation system with parallel pipes. The said infiltration irrigation system consists primarily of a water feeding pipeline [4], an air relieving pipeline [5] and multiple water permeable storage containers [1] that are pressure resistant. Each container [1] comprises at least two components, which are coupled properly to shut out sand and dirt. The top component has a water feeding pipe connector [21] and an air relieving pipe connector [22]. The said connectors [21 and 22] are connected respectively to the water feeding pipe [41] and the air relieving pipe [42] by means of adapters [46 and 47]. The two pipes are in turn connected by means of hetero-diameter adapters [43] to branch pipes [44] leading to the main water feeding pipeline and the main air relieving pipeline. Thus, a system of two parallel pipelines is formed. The said multiple containers may be, water permeable vats [2] or double-layer water permeable vats [3] that are used in conjunction with water permeable vats [2].

Figure 3:
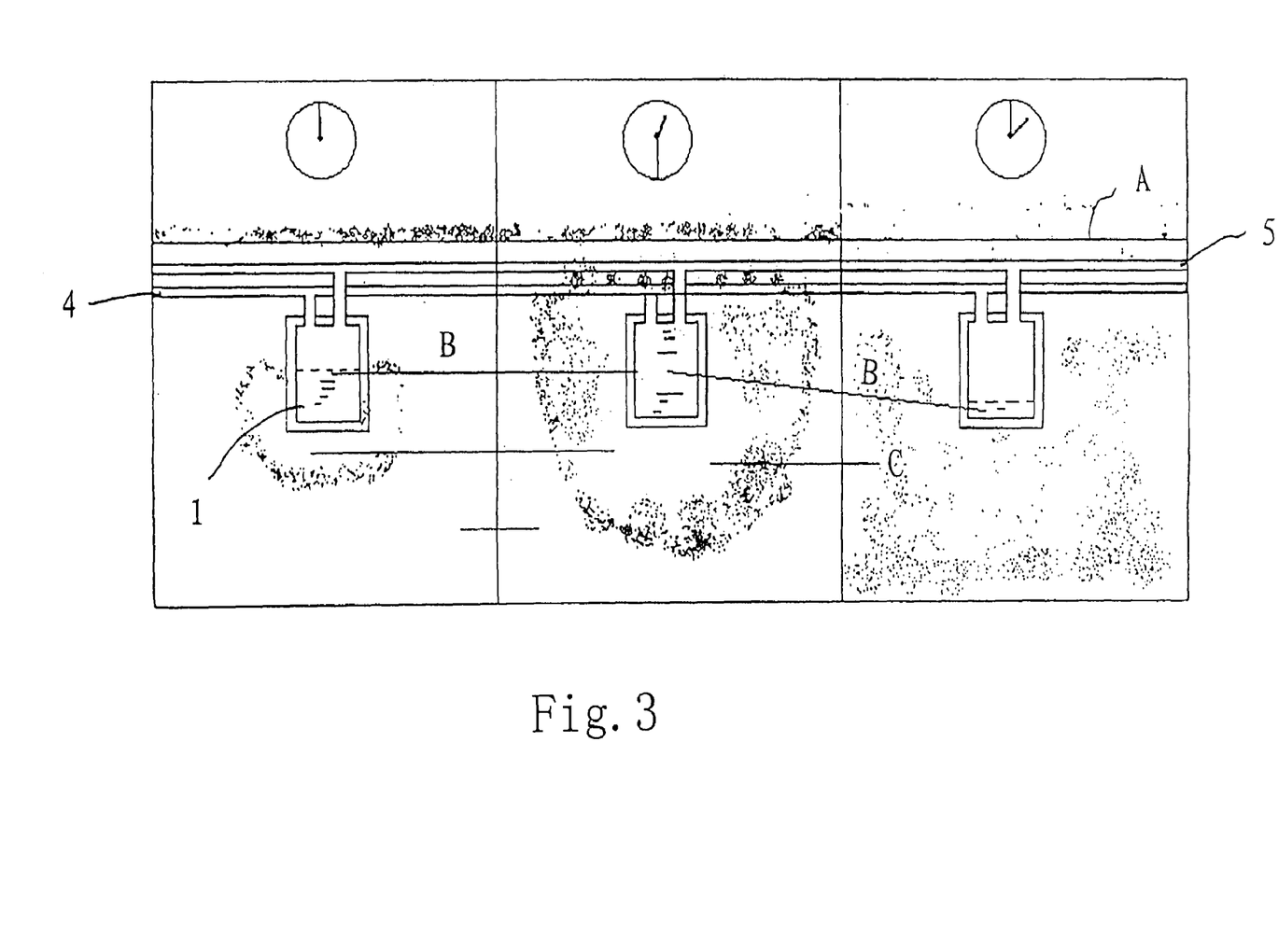
FIG. 3 shows an infiltration test in this Invention.

See FIG. 3. When the said containers [1] and part of the pipelines are buried beneath the ground surface [A], the water feeding pipeline [4] continues feeding water into the containers [1]. When the water in the containers seeps into the soil [C], the water level [B] in the containers gradually falls. This drawing shows the different moisture content and the affected scope in the soil during three different time periods. The air relieving pipeline [5] lets air into and out of the containers. The air relieving pipeline is positioned at higher elevations than the water feeding pipeline.

The pipes are made of non-permeable and pressure resistant materials. They are all buried underground, either in a sloping direction or on a level depth. The depth and density of the pipes depend on the needs of the plant roots. The following are a few application samples:

Application Sample 1

Figure 4:
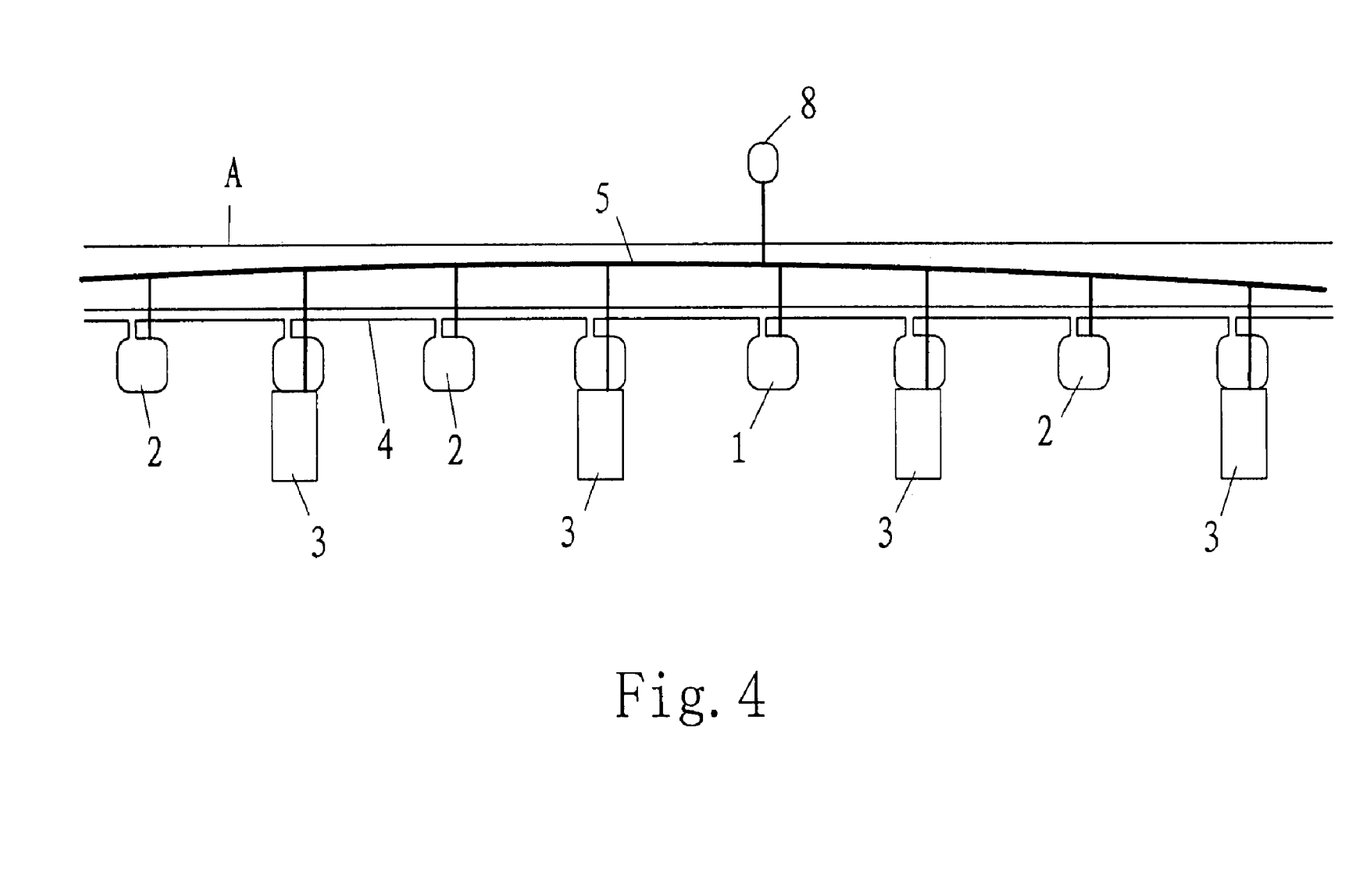
FIG. 4 shows the application of this Invention to fields in plains.

See FIG. 4. This sample relates to the application of the soil infiltration irrigation system in plains. The said infiltration irrigation system is buried underground with the air relieving pipeline [5] positioned at higher elevations than the water feeding pipeline [4]. Depending on the needs of the plant growth, combinations of water permeable vats [2] and double-layer vats [3] may be properly deployed, or the water permeable vats [2] may be used alone. The vats are buried into the soil beneath the water feeding pipeline [4]. Then, by means of branch pipes [44], hetero-diameter adapters [43], adapters [46 and 47], water feeding pipes [41], and air relieving pipes [42], the water feeding pipeline and the air relieving pipeline are connected respectively to the water feeding pipe connectors [21] and the air relieving pipe connectors [22] (not shown in the drawing) on the water permeable vats [2] and the water permeable double-layer vats [3]. The water feeding pipes [41] and the air relieving pipes [42] have the same diameter. Two-way air relieving and water shut-off valves [8] may be properly deployed at higher elevations on the air relieving pipeline [5] to keep the entire irrigation system working effectively.

Application Sample 2

Figure 5:
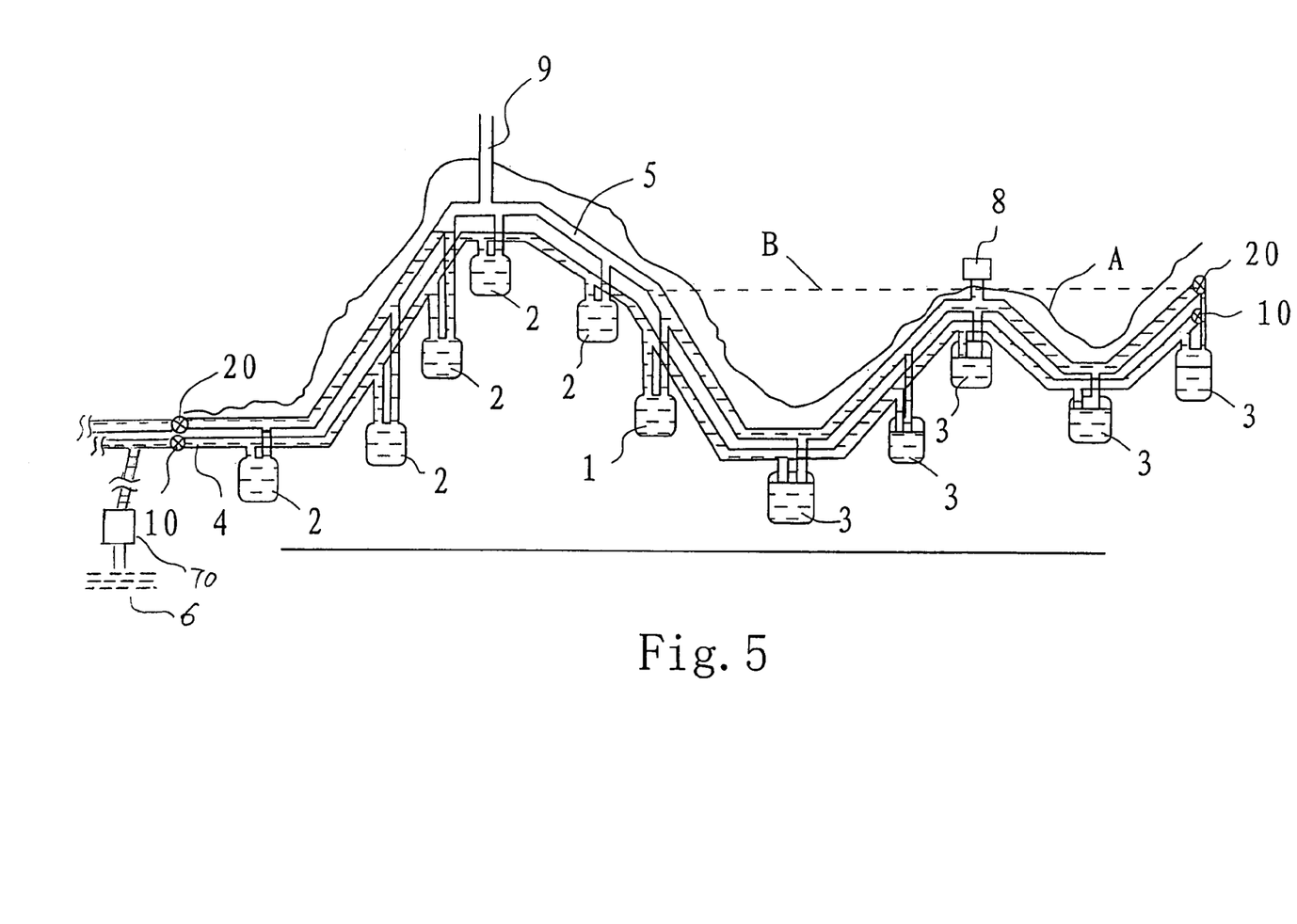
FIG. 5 shows the application of this Invention to hilly areas.
Figure 6:
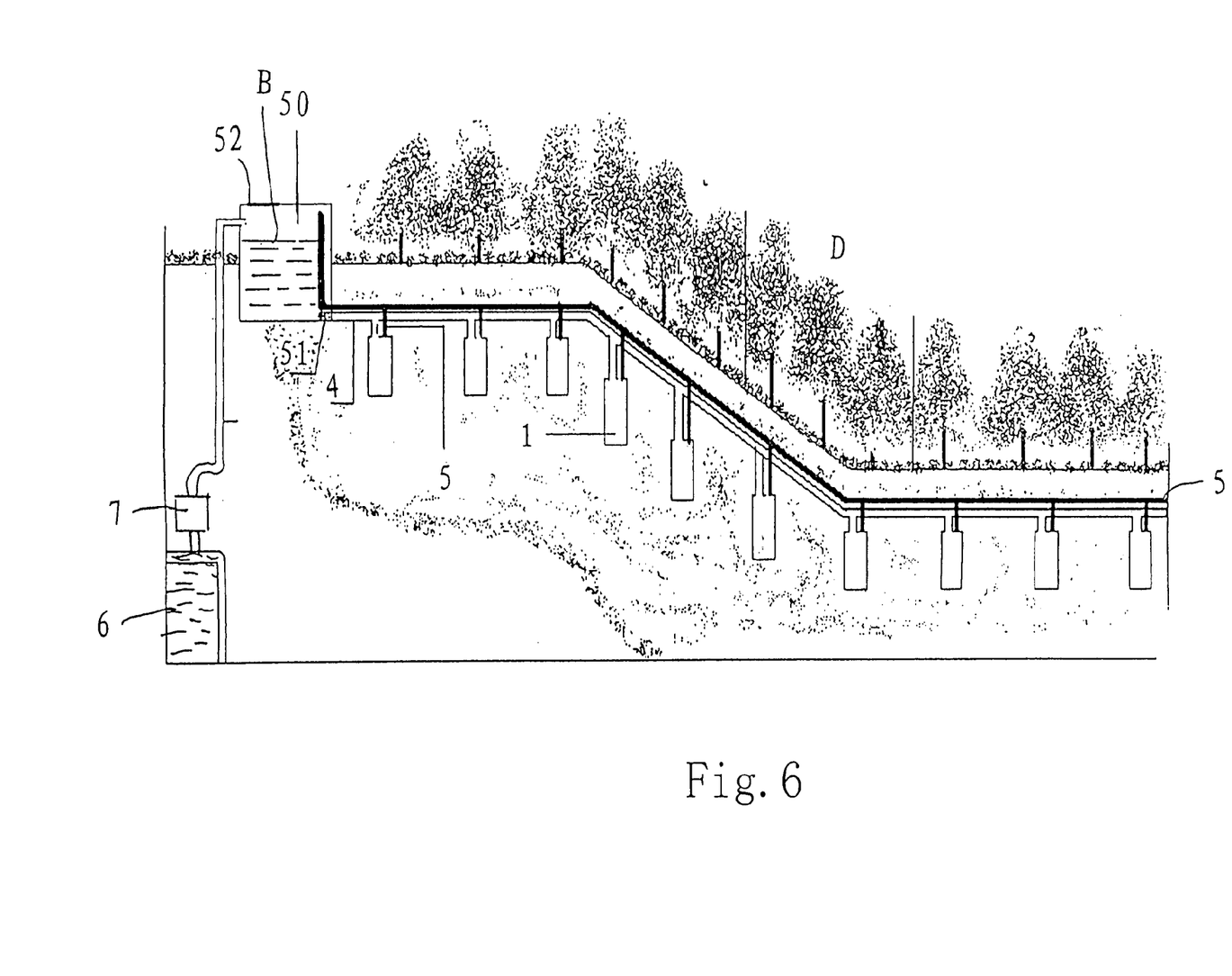
FIG. 6 shows the application of this Invention to fields on slopes.

See FIGS. 5 and 6. This sample relates to the application of the soil infiltration irrigation system in hills and slopes. It is necessary to determine the required water pressure based on the resistance loss in the pipelines and the relative elevations of the hills and slopes. Then, based on the required water pressure, it is possible to determine the required elevation of the water supply reservoir [50] or the pumping pressure of the water pumps [7]. Those are the conditions for the proper deployment of the water supply reservoir [50] or the water pumps [7].

See FIG. 5. The said air relieving pipeline [5] has air outlets [9] installed at a specific elevation, which is identical to the required elevation. In places of substantial elevation differences, two-way air relieving and water shut-off valves [8] are installed. Those valves are connected to the air relieving pipeline [5]. A master air relieving valve [20], such as a sluice valve, a stop valve, a spherical valve or a butterfly valve, is installed at each elevated back-slope terminal point of the air relieving pipeline [5]. A master water supply valve [10] is installed at either end of the water feeding pipeline and at each necessary point on the water feeding pipeline. The master valves [10 and 20] should be two-way air relieving and water shut-off valves.

In the water feeding process, when the water level reaches or exceeds the position of the two-way air relieving and water shut-off valve at each elevated point, the two-way valve automatically shuts off to prevent water from flowing through.

The applications discussed above may be pressurized feeding or atmospheric feeding.

See FIG. 6. In the atmospheric feeding process, a water supply reservoir [50] with a cover [52] is built upstream of the water feeding pipeline [4] and the air relieving pipeline [5]. The reservoir is built with non-degradable solid materials to meet the requirements on water storage and non-permeability. A screen [51] is placed over each water inlet and air outlet to prevent debris from entering and clogging the pipelines and the containers. The connection for the water feeding pipeline is at the bottom of the reservoir [50] and the connection for the air relieving pipeline is above the water feeding level [B] in the reservoir. Decals on the reservoir should indicate the total volume of the containers in the system as well as implementation diagrams for each section of the system. The reservoir [50] helps to alleviate the irrigation water pressure, thus preventing damage to the irrigation system due to excessive water pressure. It also helps in the choice of irrigation water supply and water transport method. This application is suitable for planted areas that have permanent irrigation water supply sources but need to have the water transported to desired places.

In the pressurized feeding process, when the planted area [D] is higher than the water source [6] and the water feeding pipeline connection point, a two-way air relieving and water shut-off valve [8] is added to the system and installed above the ground surface [A] (see FIG. 5). The water feeding pipeline [4] has an externally connected booster pump [70]. Water is sent directly to fill the water permeable vats [2] and double-layer water permeable vats [3] or just the water permeable vats [2] alone. Then, water slowly seeps through the vats into the soil around the plant roots to be directly absorbed by the roots. This is the infiltration irrigation approach for plants.

Alternatively, the said irrigation water may be directly fed into a container [1] through its water feeding pipe connector [21]. The water flows out of this container through its air relieving pipe connector into the water feeding pipe connector [21] of the next vat, and so on. Thus, multiple vats may be filled at once.

Any point in the pipeline system may be selected as the water feeding point and be used to complete the irrigation task at once.

One or multiple outlets on the said air relieving pipeline [5] may be equipped with one or multiple two-way air relieving and water shut-off valves [8]. The outlets are set up at the elevated points on the system. Each outlet may stand alone and all the air relieving pipes need not be interconnected.

Figure 7:
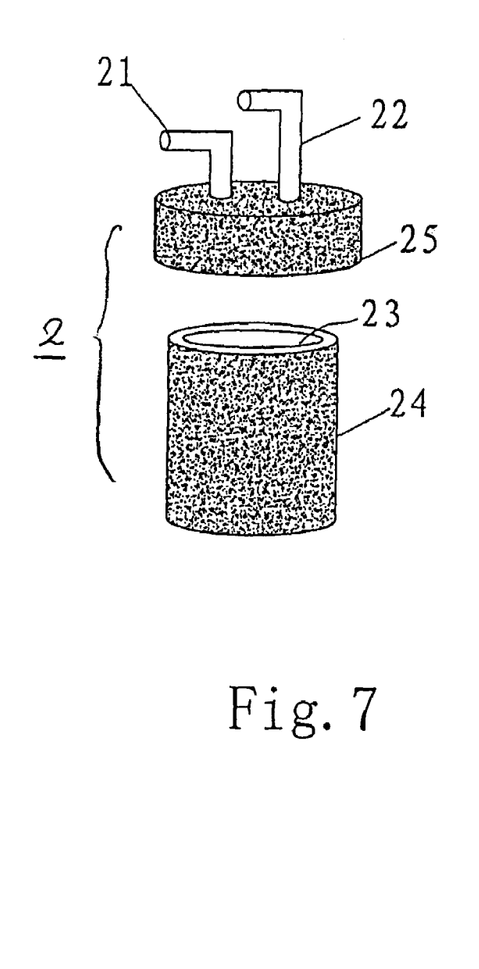
FIG. 7 shows the structural blowup of the water permeable vat in this Invention.
Figure 8:
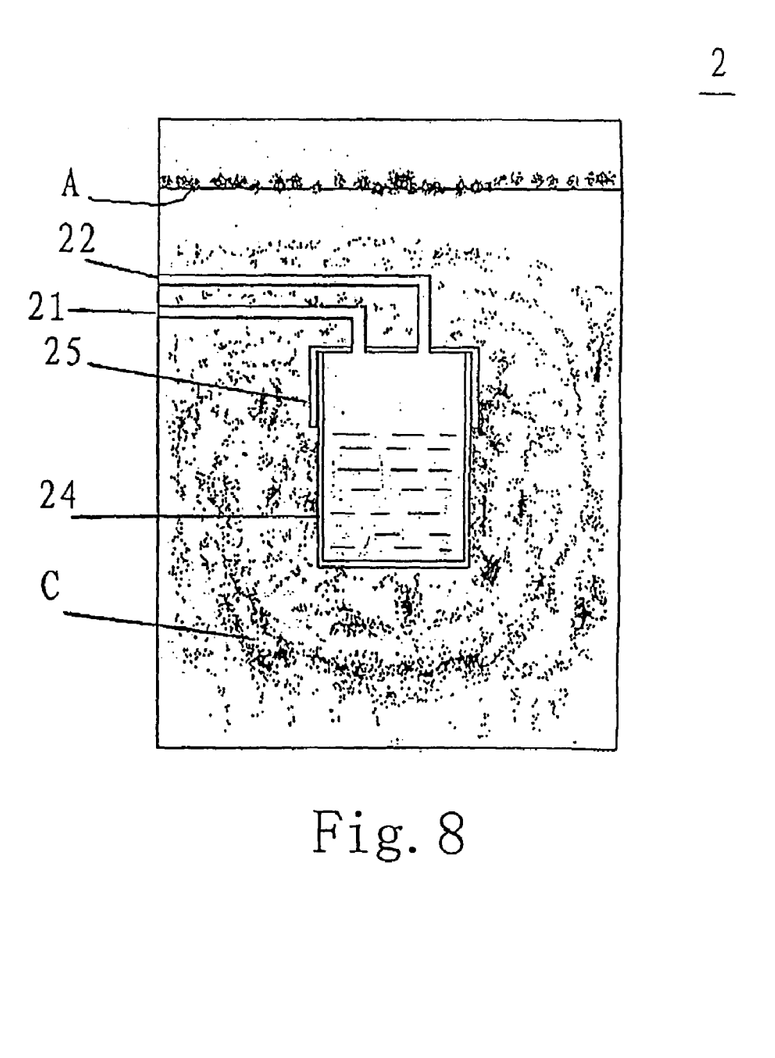
FIG. 8 shows the assembly of the water permeable vat in this Invention.
Figures 9A, 9B, 9C, 9D, 9E, 9F, 9G:
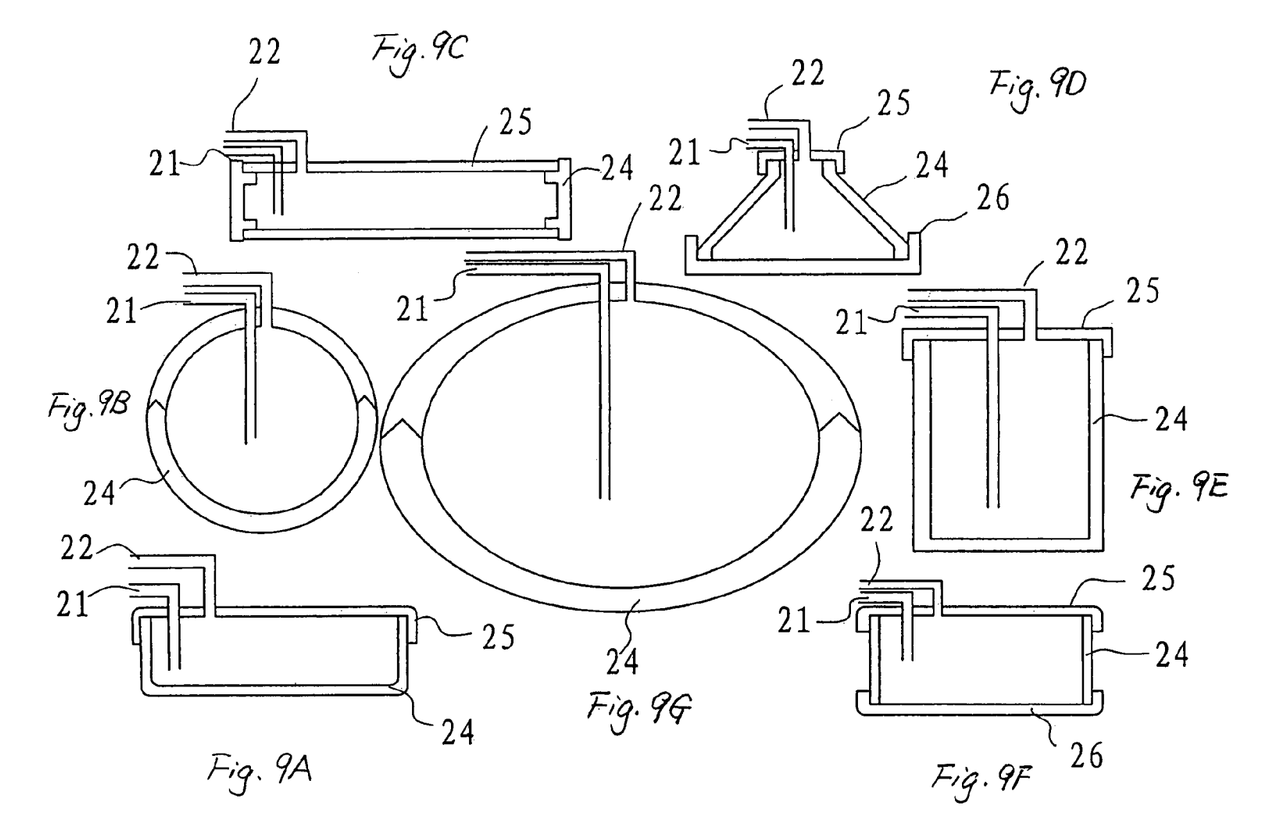
FIGS. 9A-9G show various structures of the water permeable vat in this Invention.

See FIGS. 7 and 8. The equipment used in this soil infiltration irrigation system is a water permeable vat.

The said water permeable vat [2] is made of non-degradable solid materials and possesses both the water storage and water infiltration features. The vat consists of a vat body [24] and a lid [25]. The vat body [24] is the water storage container [23] and has a meshed water permeable internal structure. It has the infiltration irrigation function as well as the water storage function. The lid [25] has two connectors installed: a water feeding pipe connector [21] and an air relieving pipe connector [22].

The said vat body [24] may assume the form of a cylinder, a prism, a cube, a pyramid or some other objects (see the forms shown in FIGS. 9A-9G).

The said water feeding pipe connector [21] and air relieving pipe connector [22] on the vat lid [25] may offer the plug-in type of connection or the screw-on type of connection. They are connected to the water feeding pipe adapter [47] and the air relieving pipe adapter [46] respectively.

The said vat body [24] is made from a mixture of clay and sand by calcination.

The said vat body [24] is made from a mixture of cement and pebbles by extrusion.

The said vat body [24] is made from pressed sand tubes.

The said vat body [24] and vat lid [25] may be separate components or a composite unit. The circular edge of the lid [25] forms a band that encircles the vat body [24] on the outer surface.

The said vat body [24] and vat lid [25] are separate components. A base [26] may be added to and fixed on the vat body [24] (see FIG. 9).

The said water permeable vat [2] and the pipelines discussed earlier are deployed around the plant roots that need irrigation. When water is supplied to the system, it begins to irrigate the plants. Neutralized water, rainwater, underground water and water from rivers and lakes is used to meet the plant irrigation needs. At the same time, due to its own gravity, the irrigation water seeps deep down the soil to form new water sources.

Figure 10:
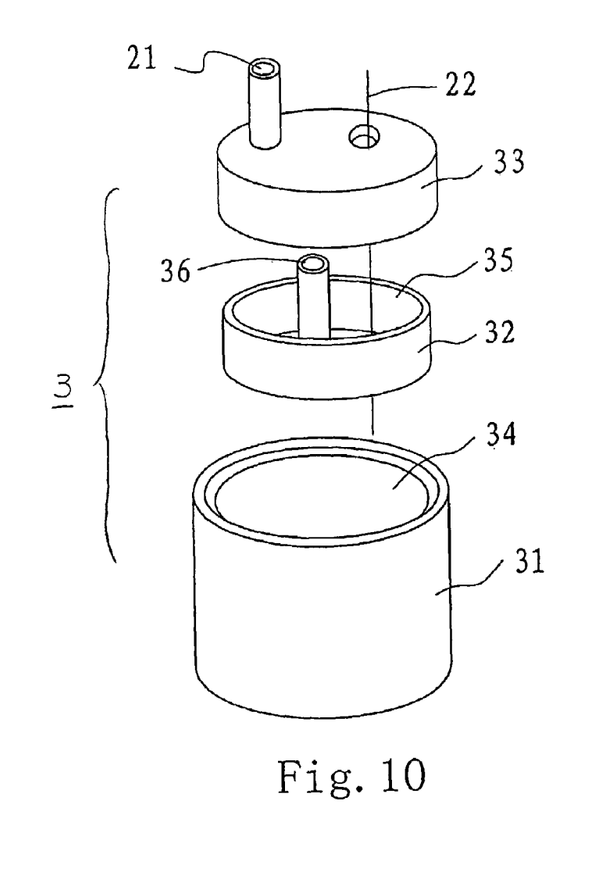
FIG. 10 shows the structural blowup of the double-layer vat in this Invention.
Figure 11:
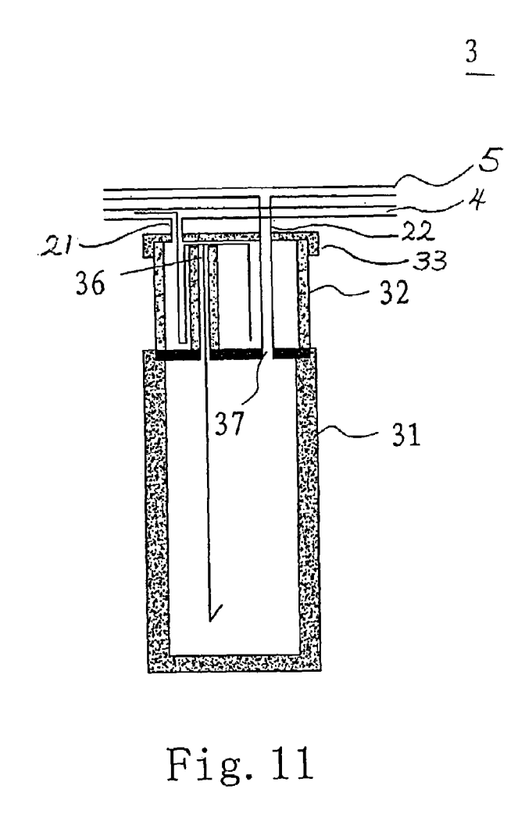
FIG. 11 shows the assembly of the double-layer vat in this Invention.

See FIGS. 10 and 11. The equipment used in this soil infiltration irrigation system is a double-layer water permeable vat.

The said double-layer water permeable vat [3] is made of non-degradable solid materials and possesses both the water storage and water infiltration features. The vat consists of an inner layer vat body [31], an outer layer vat body [32] and a lid [33]. The inner layer vat body [31] and the outer layer vat body [32] form the water storage containers [34 and 35].

The outer layer vat body [32] has a water overflow hole [36] and an air relieving hole [37], which are connected to the inner layer vat body [31]. The vat has a meshed water permeable internal structure. It has the infiltration irrigation function as well as the water storage function. The lid [33] has two connectors installed: a water feeding pipe connector [21] and an air relieving pipe connector [22].

The said water feeding pipe connector [21] is connected to the outer layer vat body [32] while the air relieving pipe connector [22] is connected to the inner layer vat body [31]. The bottom section of the outer layer vat body is solid and water resistant.

The said water feeding pipe connector [21] and air relieving pipe connector [22] on the vat lid [33] may offer the plug-in type of connection or the screw-on type of connection. They are connected to the water feeding pipe adapter [47] and the air relieving pipe adapter [46] respectively.

The said inner layer vat body [31] and outer layer vat body [32] are made from a mixture of clay and sand by calcination.

The said inner layer vat body [31] and outer layer vat body [32] are made from a mixture of cement and pebbles by extrusion.

The said inner, layer vat body [31] and outer layer vat body [32] are made from pressed sand tubes.

The said inner layer vat body [31], outer layer vat body [32] and vat lid [33] are separate components. The circular edge of the lid [33] forms a band that encircles the outer layer vat body [32] on the outer surface. The bottom section of the outer layer vat body [32] is solid and water resistant. It clips on to the upper section of the vat body.

The said double-layer water permeable vats function in the same manner as the water permeable vats. However, they are deployed in places where the plant roots go deeper. They are placed around plant roots in deep soil layers where the regular water permeable vats cannot reach. Therefore, they are used to meet the plant needs at different soil depths. Generally speaking, the outer lay vat bodies [32] are suitable for surface soil layer irrigation while the inner layer vat bodies [31] are used for deep soil layer water storage and irrigation.

Figure 12:
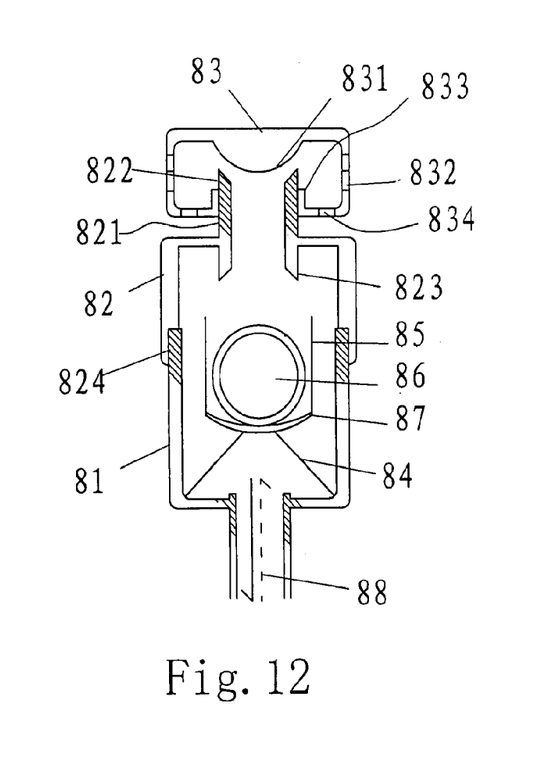
FIG. 12 shows the structural blowup of the two-way air relieving and water shut-off valve.
Figure 13:
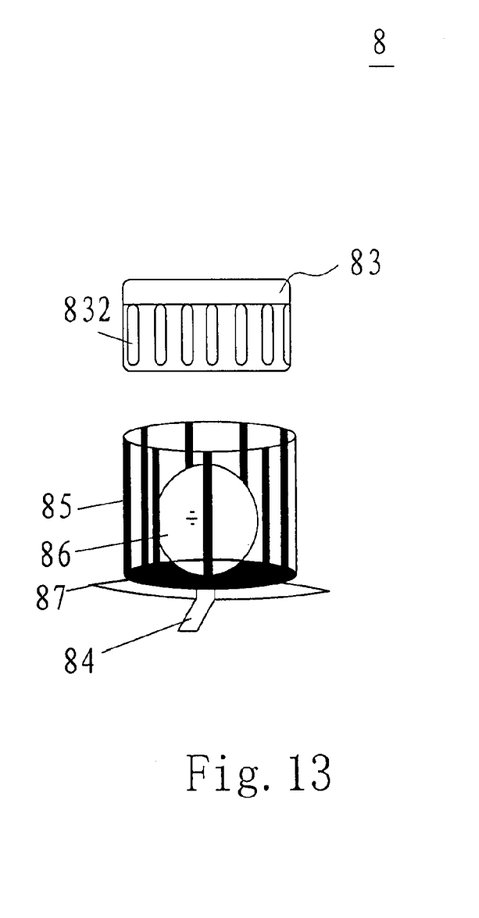
FIG. 13 is a structural diagram of some parts from FIG. 12.

See FIGS. 12 and 13. The equipment used in this soil infiltration irrigation system may also include a two-way air relieving and water shut-off valve.

The said two-way valve [8] opens when it detects air and closes when it detects water. It is a duplex buoy shut-off valve.

The said two-way air relieving and water shut-off valve [8] consists mainly of a valve body [81], a valve head [82], and an air relieving cap [83], which sits on the valve head [82]. The cap has multiple air relieving holes on its perimeter and a semi-spherical valve core inside. The valve body [81] has an integral bracket [84] with a blue frame [85]. Inside the blue frame is a hollow floating ball [86], which may be made of rubber or metals. The upper opening of the valve body [81] connects with the valve head [82]. An air relieving connector [88] is installed in the lower opening at the bottom section of the valve body.

The said valve head [82] is a hollow dome. Its bottom opening has grooves [824] to connect with the outer edge of the upper opening of the valve body [81]. In the upper section of the valve head is a valve seating cage [821]. The upper end of the seating cage with external screw threads on the perimeter is the upper seat [822] for the semi-spherical valve core [831]. The lower end of the seating cage is the lower seat [823] for the floating ball [86]. The seating cage [821], the semi-spherical valve core [831] and the floating ball [86] are on the same axial line.

The said air relieving cap [83] is a hollow cylinder. The semi-spherical valve core [831] sits in the center of the upper interior of the cap. There are multiple evenly spaced through-holes [832] on the perimeter of the cap. The bottom part of the cap is a flange [833] with an opening that has internal screw threads and evenly spaced round holes [834].

The said bracket [84] also includes a floating ball holder [87] at the bottom of the blue frame [85]. The holder is at the same axial angle with the valve seating cage [821] so that, after the floating ball [86] floats up, the holder may hold the ball in the lower seat [823] of the valve seating cage.

The said two-way air relieving and water shut-off valves [8] are deployed at the outlets on the air relieving pipeline and the inlets on the water feeding pipeline. Such a deployment facilitates air relieving along the pipelines and makes it possible to expand the irrigation area and range. With such a deployment, the system is able to perform pressurized feeding from downstream to the upstream irrigation area. Such a deployment can replace the function of a water supply reservoir and is suitable for use with permanent water sources and in mechanical pressurized water feeding.

At the beginning of the water feeding process, with the two-way air relieving and water shut-off valves [8] connected to the air relieving pipeline [5] at elevated points, first turn off the master valve [20] at the head of the air relieving pipeline [5], and then turn loose the air relieving cap [83] on each two-way air relieving and water shut-off valve [8] to open the cap. When water is fed into the vats, the air inside the vats flows through the air relieving pipeline [5] to the nearest two-way air relieving and water shut-off valve [8] and then into the atmosphere. The escape of the air ensures that water will fill the vats. When all the vats near a specific two-way air relieving and water shut-off valve [8] are filled with water, the extra water flows from the air relieving pipe connector on each vat into the air relieving pipeline [5] and then out of the nearest two-way air relieving and water shut-off valve [8]. Meanwhile, the floating ball rises to the lower valve seat [823] to prevent the overflow of water. If the floating ball malfunctions and fails to shut off the overflow, turn the air relieving cap [83] tight to close the two-way air relieving and water shut-off valve [8] so that the water feeding pipeline [4] may continue to feed water to other water permeable vats [2] or double-layer water permeable vats [3]. Otherwise, the water in the water feeding pipeline [4] will flow through the two-way air relieving and water shut-off valve [8] onto the ground, thus disrupting the water supply to the other vats.

The following is a proper procedure for infiltration irrigation. First, check the master air relieving valves [20] at both ends of the air relieving pipeline [5] and turn them off. Turn loose the air relieving cap [83] on each two-way air relieving and water shut-off valve [8] to open the cap. Open the master water feeding valve [10] at the end of the water feeding pipeline [4]. Determine the required water feeding pressure based on the resistance in the pipelines and the relative elevation of the highest point in the soil infiltration irrigation system. Then, based on the total volume of the pipelines and the total volume of the vats, determine the required amount of water needed for the irrigation. Transport that amount of water into the water supply reservoir. Open the master water feeding valve [10] at the head of the water feeding pipeline [4] to feed water into the system pipelines. When water is fed into the vats, the air inside the vats flows through the air relieving connector and the air relieving pipeline to the two-way air relieving and water shut-off valve and then into the atmosphere.

When the vats are filled with water, due to the cut-off function of the air relieving pipeline and the time delay, the water head in the air relieving pipeline [5] is always behind the water head in the water feeding pipeline [4]. An effective air outlet is deployed on the air relieving pipeline [5] at the highest elevation in the entire system. When water overflows from that outlet, it means that the infiltration irrigation process is completed.

During the irrigation process, the water in the pipelines will also flow into the vats and then gradually seeps into the soil to irrigate the plant roots.

This Invention has the following benefits:

1. Since it is almost totally buried underground, this soil infiltration irrigation system offers the benefit of one-time investment input for long-time use. It does not occupy any plant growth space or ground surface space. It is simple to operate and saves time and effort. It does not damage the plants. Instead, the air circulation provided by the air relieving pipeline improves the breathing conditions and the fertility of the soil, thus facilitating plant growth.

2. This soil infiltration irrigation system is simple in structure and does not have rigid requirements on accuracy. It may be deployed in a lot of different places and is suitable for irrigation in planted areas on plains, slopes, hills, deserts, and hard ground surfaces. It offers the benefits of ready component availability, low costs, and a long life time. The pipeline network of this system makes it possible to expand the irrigation range, ensure simple and smooth operation, and save time and labor.

3. This soil infiltration irrigation system does not have rigid requirements on water quality, so it may make full use of waste water from people's daily life. Neutralized or treated waste water, rainwater, and water from rivers and lakes may all be used in plant irrigation. After meeting the irrigation needs, any extra water, due to its gravity, seeps into the deep soil layers to replenish the underground water resources. The utilization of waste water and the retention of natural water form a positive cycle. Therefore, this system is useful to the ecological preservation and development in regions that have a shortage of water resources.

The invention claimed is:

1. A soil infiltration irrigation system comprising:
   (a) a water feeding pipeline:
   (b) an air relieving pipeline aligned with and disposed above said water feeding pipeline;
   (c) a two-way valve connected to said air relieving pipeline and positioned above the ground; said two-way valve comprising (i) a hollow valve body having an upper opening, a lower opening at a bottom thereof, an integral bracket disposed above said lower opening, a frame disposed on said bracket, and a floating ball disposed inside said frame; (ii) a hollow valve head having a bottom opening connecting with said upper opening of said valve body, and a valve seating cage at an upper portion of said valve head; said valve seating cage having an upper seat formed by an upper end portion thereof, and a lower seat formed by a lower end portion thereof; and (iii) a hollow air relieving can connected to said valve head; and
   (d) multiple water permeable vats; each of said vats comprising a lid and a water permeable vat body; said lid having a water feeding pipe connector and an air relieving pipe connector; said water feeding pipe connector being connected to said water feeding pipeline by a water feeding pipe, and said air relieving pipe connector being connected to said air relieving pipeline by an air relieving pipe, wherein said system can operate at positive pressure to fill water into said multiple water permeable vats and said two-way valve prevents said water overflowing during filling.

2. The soil infiltration irrigation system of claim 1, wherein said water feeding pipeline is connected to a plurality of branch pipes; wherein said water feeding pipe is connected to said water feeding pipeline by one of said plurality of branch pipes.

3. The soil infiltration irrigation system of claim 1, wherein said air relieving pipeline is connected to a plurality of branch pipes; wherein said air relieving pipe is connected to said air relieving pipeline by one of said plurality of branch pipes.

4. The soil infiltration irrigation system of claim 1 further comprising a water supply reservoir located upstream of said water feeding pipeline and said air relieving pipeline, wherein said water feeding pipeline is connected to a bottom of said reservoir and one end of said air relieving pipeline is disposed above water in said reservoir.

5. The soil infiltration irrigation system of claim 1 further comprising a booster pump connected between said water feeding pipeline and a water source, for directly supplying pressurized water through said booster pump when an area to be irrigated is higher than said water source.

6. The soil infiltration irrigation system of claim 1, wherein said air relieving cap has multiple air relieving holes on a periphery thereof and a semi-spherical valve core located at a center of an upper interior of said cap; said semi-spherical valve core being coaxial with said valve seating cage and said floating ball.

7. The soil infiltration irrigation system of claim 6, wherein said floating ball seals said lower seat of said valve seating cage when said floating ball floats.

8. The soil infiltration irrigation system of claim 1, wherein said vat body is made of non-degradable solid materials forming a water permeable meshed structure and having both water storage and water infiltration functions.

9. The soil infiltration irrigation system of claim 8, wherein said vat body is made of a mixture of clay and sand by calcination.

10. The soil infiltration irrigation system of claim 8, wherein said vat body is made of a mixture of cement and pebbles by extrusion.

11. The soil infiltration irrigation system of claim 8, wherein said vat body is made of a mixture of pressed sand tubes.

12. The soil infiltration irrigation system of claim 1, wherein said vat body comprises:
   (a) a first layer vat body made of non-degradable solid materials forming a water permeable meshed structure and having both water storage and water infiltration functions; and
   (b) a second layer vat body disposed on top of an upper section of said first layer vat body; said second layer vat body being made of non-degradable solid materials forming a water permeable meshed structure and having both water storage and water infiltration functions, and having a solid and water resistant bottom section; said second layer vat body having water overflow and air relieving holes in communication with said first layer vat body;

wherein said lid is disposed on top of said second layer vat body; said water feeding pipe connector connects to said second layer vat body and said air relieving pipe connector connects to said first layer vat body.

13. The soil infiltration irrigation system of claim 12, wherein said first and second layer bodies are made of a mixture of clay and sand by calcination.

14. The soil infiltration irrigation system of claim 12, wherein said first and second layer bodies are made of a mixture of cement and pebbles by extrusion.

15. The soil infiltration irrigation system of claim 12, wherein said first and second layer bodies are made of a mixture of pressed sand tubes.

* * * * *